(12) United States Patent
Hart et al.

(10) Patent No.: US 7,483,672 B2
(45) Date of Patent: Jan. 27, 2009

(54) SATELLITE SYSTEM FOR VESSEL IDENTIFICATION

(75) Inventors: Nicholas Richard Hart, Anchorage (SG); Christopher Boyce Meulman, North Turramurra (AU); Peter James Clifford, Mt Pleasant (AU)

(73) Assignee: Thiss Technologies Pte Ltd, Tiong Bahru Industrial Estate (SG)

( * ) Notice: Subject to any disclaimer, the term of this patent is extended or adjusted under 35 U.S.C. 154(b) by 311 days.

(21) Appl. No.: 10/496,378

(22) PCT Filed: Nov. 26, 2002

(86) PCT No.: PCT/AU02/01591

§ 371 (c)(1),
(2), (4) Date: Nov. 3, 2004

(87) PCT Pub. No.: WO03/046603

PCT Pub. Date: Jun. 5, 2003

(65) Prior Publication Data

US 2005/0124291 A1    Jun. 9, 2005

(30) Foreign Application Priority Data

Nov. 26, 2001 (AU) ................................. PR9103

(51) Int. Cl.
*H04B 7/185*    (2006.01)
(52) U.S. Cl. .................... 455/12.1; 455/3.02; 455/427; 455/13.1; 455/13.2

(58) Field of Classification Search ............... 455/3.02, 455/427, 12.1, 13.2, 98; 370/316
See application file for complete search history.

(56) References Cited

U.S. PATENT DOCUMENTS

| | | | | |
|---|---|---|---|---|
| 4,872,015 | A * | 10/1989 | Rosen | 342/353 |
| 5,404,135 | A * | 4/1995 | Janex | 340/988 |
| 5,552,798 | A | 9/1996 | Dietrich et al. | |
| 5,682,139 | A | 10/1997 | Pradeep et al. | |
| 5,943,324 | A * | 8/1999 | Ramesh et al. | 370/321 |
| 6,052,364 | A * | 4/2000 | Chalmers et al. | 370/312 |

(Continued)

OTHER PUBLICATIONS

"Frequency Allocations for Satellite Services" in Satellite Communications, Second Edition, International Editions (1996) (McGraw-Hill ISBN 0-07-053370-9 (HC), p. 2.

*Primary Examiner*—Matthew D. Anderson
*Assistant Examiner*—Dominic E Rego
(74) *Attorney, Agent, or Firm*—Ladas & Parry LLP (57) ABSTRACT

A system for communicating data among a plurality of ships is disclosed. The system comprises means for sending an inbound message from one of said plurality ships (501), via at least one geostationary satellite (503) and base station (505) to a control center (507). Spatial information obtained from the control messages is consolidated by the control center (507) to reduce traffic volume of outbound messages associated with inbound messages. Consolidated messages are then sent via base station (505) and at least one geostationary satellite (503), to a sub-set of said plurality of ships, wherein sub-set of ships are in at least one of the same (a) geographic region, and (b) adjacent region(s), as said one ship.

5 Claims, 7 Drawing Sheets

U.S. PATENT DOCUMENTS

| | | |
|---|---|---|
| 6,104,978 A | 8/2000 | Harrison et al. |
| 6,160,994 A | 12/2000 | Wiedeman |
| 6,185,409 B1 * | 2/2001 | Threadgill et al. .......... 455/12.1 |
| 6,233,463 B1 | 5/2001 | Wiedeman et al. |
| 6,272,338 B1 | 8/2001 | Modzelesky et al. |
| 6,272,341 B1 | 8/2001 | Threadgill et al. |
| 6,275,773 B1 | 8/2001 | Lemelson et al. |
| 6,477,370 B1 * | 11/2002 | Sigler et al. ................. 455/427 |
| 6,542,739 B1 * | 4/2003 | Garner ....................... 455/427 |
| 6,615,022 B1 * | 9/2003 | Baba ......................... 455/12.1 |
| 6,775,519 B1 * | 8/2004 | Wiedeman et al. ......... 455/12.1 |
| 6,778,509 B1 * | 8/2004 | Ravishankar et al. ....... 370/322 |
| 6,892,068 B2 * | 5/2005 | Karabinis et al. ........... 455/429 |
| 2002/0039900 A1 * | 4/2002 | Wiedeman et al. .......... 455/428 |
| 2002/0098802 A1 * | 7/2002 | Karabinis .................. 455/13.1 |
| 2002/0132619 A1 * | 9/2002 | Wiedeman et al. .......... 455/427 |
| 2002/0146982 A1 * | 10/2002 | McLain et al. ................ 455/63 |

* cited by examiner

SATELLITE SYSTEM FOR VESSEL IDENTIFICATION

FIELD OF THE INVENTION

The present invention relates generally to a satellite system for identifying and tracking vessels on the high seas.

BACKGROUND

The discussion contained in this "Background" section relating to prior art arrangements is based to some degree on documents or devices which form public knowledge through their respective publication and use. Such should not be interpreted as a representation that such documents or devices in any way form part of the common general knowledge in the art.

The most successful mobile tracking system worldwide is the Qualcomm developed Omintracs™ service in North America, which is currently supporting in excess of 250,000 long distance trucks. Using existing geostationary satellites the service was launched in the early 1990's and later successfully exported to both Europe (Euteltracs) and Japan. A marine terminal version termed Boatracs™ was also launched a few years later and has now established market base of about 80,000 units.

In Fisheries vessel management, various satellite systems have been implemented for vessel tracking, of which the Inmarsat C™ system has been the most widely deployed. In excess 15,000 fishing vessels worldwide are currently tracked using various satellite systems and merchant ship owners are using satellite-tracking networks for fleet management purposes.

These satellite networks have demonstrated the capability of providing robust, and reliable communications with a uniform high quality of service over a wide area. This has been a significant commercial advantage over terrestrial radio competitive products even in developed countries such as the United States.

Historically satellite networks have been regarded as relatively expensive in terms of terminal equipment and airtime operational costs. Recent advances in technology have allowed dramatic reductions in both cost elements as seen with modern satellite hand phones.

Current Global Mobile Satellite Systems (GMSS) such as Inmarsat, use the L band spectrum, which is limited to about a 30 MHz spectrum around 1.5 GHz. This resource has to be shared with other regional satellite networks such as the Optus Australian Domestic system. This limited spectrum has resulted in relatively expensive airtime costs. The C band spectrum (4 to 6 GHz) has historically been used for managed and leased communication services, point-to-point and point-to-multipoint connections and provides cost effective satellite communications.

SUMMARY

Disclosed are arrangements which provide a cost-effective and pseudo-real-time communications service to mobile platforms under most weather conditions. The arrangements make use of use geo-synchronous satellite(s) operating in concert with base station(s) and control centre(s), and use message communication and rebroadcast techniques in order to provide the mobile platforms with a continuously updated picture of mobile platforms traffic in their "local" area.

According to a first aspect of the present disclosure, there is provided a method of communicating data among a plurality of mobile platforms, said method comprising the steps of:

sending an inbound message, from one of said plurality of mobile platforms, via at least one geostationary satellite and a base station to a control centre, said inbound message including spatial information for said one mobile platform;

consolidating, by the control centre, of the inbound message, to thereby reduce a traffic volume of outbound messages associated with said inbound message; and sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform.

According to another aspect of the present disclosure, there is provided a system for communicating data among a plurality of mobile platforms, said system including at least one geostationary satellite, a base station and a control centre, the system further comprising:

means for sending an inbound message, from one of said plurality of mobile platforms, via said at least one geostationary satellite and the base station to the control centre, said inbound message including spatial information for said one mobile platform;

means for consolidating, by the control centre, of the inbound message, to thereby reduce a traffic volume of outbound messages associated with said inbound message; and means for sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform.

According to another aspect of the present disclosure, there is provided a C-band terminal including an antenna having a nominal gain of 18 dBi, and adapted (a) to transmit a signal having a bit-rate between 300 and 2400 bps, and (b) to receive a signal having a bit-rate between 11 to 64 kps, wherein the transmitting and the receiving is performed without using a diplexer.

According to another aspect of the present disclosure, there is provided a mobile terminal adapted for use in a system for communicating data among a plurality of mobile platforms, said system including at least one geostationary satellite, a base station, said mobile terminal and a control centre, the mobile terminal comprising:

means for determining, for one of said plurality of mobile platforms on which the mobile terminal is located, spatial information for the mobile platform; and means for sending an inbound message, via said at least one geostationary satellite and the base station to the control centre, said inbound message including the spatial information.

According to another aspect of the present disclosure, there is provided a control centre in a system for communicating data among a plurality of mobile platforms, said system including at least one geostationary satellite, a base station and said control centre, the control system comprising:

means for consolidating an inbound message from one of said plurality of mobile platforms to thereby reduce a traffic volume of outbound messages associated with said inbound message; wherein the inbound message includes spatial information for said one of said plurality of mobile platforms, and means for sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform.

According to another aspect of the present disclosure, there is provided a computer program product including a computer readable medium having recorded thereon a computer program for directing a processor to execute a method of communicating data among a plurality of mobile platforms, said program comprising:

code for sending an inbound message, from one of said plurality of mobile platforms, via at least one geostationary satellite and a base station to a control centre, said inbound message including spatial information for said one mobile platform;

code for consolidating, by the control centre, of the inbound message, to thereby reduce a traffic volume of outbound messages associated with said inbound message; and code for sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform.

According to another aspect of the present disclosure, there is provided a computer program for directing a processor to execute a method of communicating data among a plurality of mobile platforms, said program comprising:

code for sending an inbound message, from one of said plurality of mobile platforms, via at least one geostationary satellite and a base station to a control centre, said inbound message including spatial information for said one mobile platform;

code for consolidating, by the control centre, of the inbound message, to thereby reduce a traffic volume of outbound messages associated with said inbound message; and code for sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform.

Other aspects of the invention are also disclosed.

BRIEF DESCRIPTION OF THE DRAWINGS

One or more embodiments of the present invention will now be described, by way of example only, with reference to the accompanying drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

The disclosed system is an Automatic Re-broadcast System (ABS), which allows information regarding a vessel's identity, position, course, speed and other relevant information to be sent to other ships in the area, as well as to shore. The system discloses ship to shore transmissions sent over in-bound satellite links to various Base Stations that route data, generally using terrestrial links, to a Master Control Centre (MCC) for processing.

Figure 1:
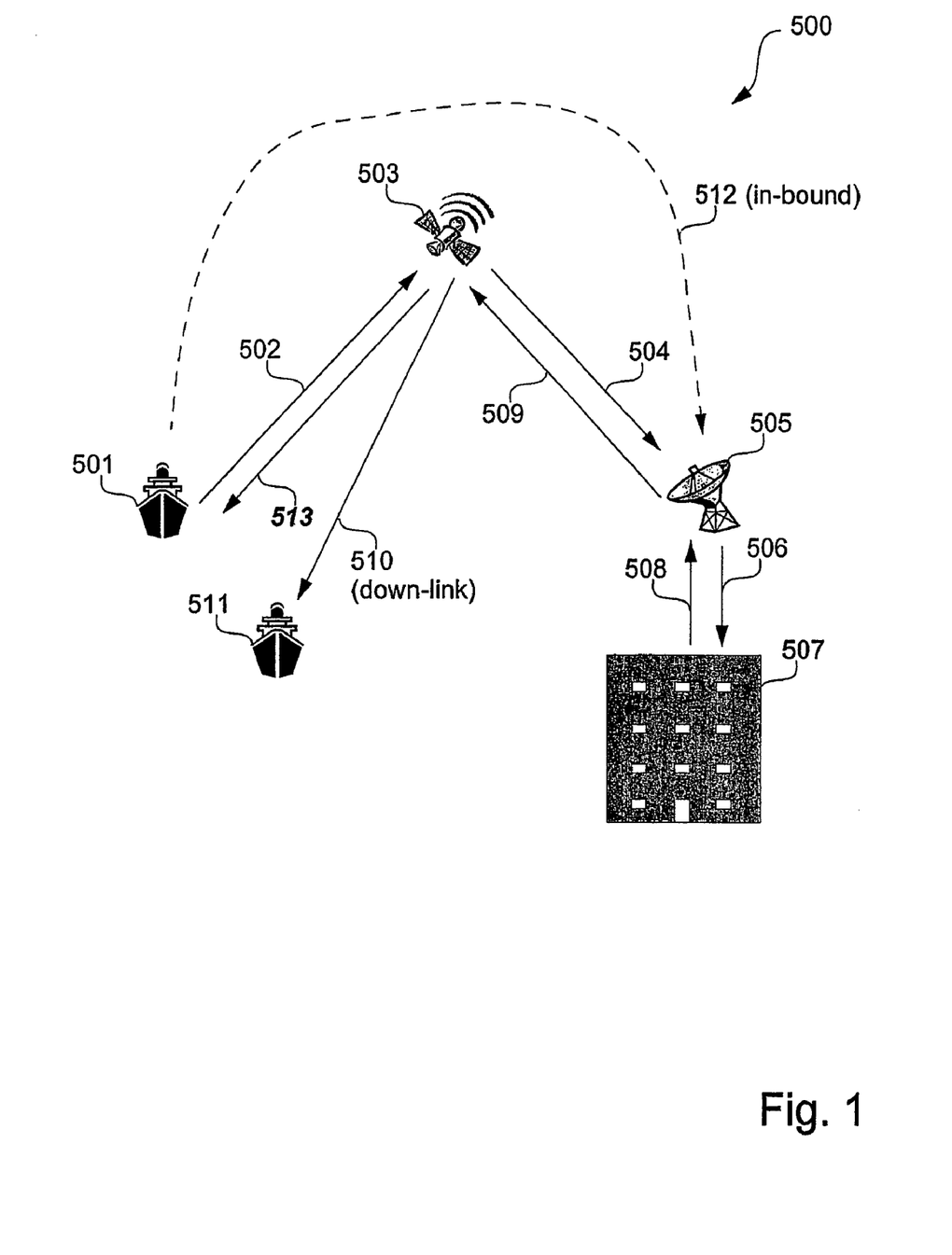
FIG. 1 shows a functional diagram of a system in which the disclosed communications technique can be practiced.

FIG. 1 serves to illustrate the system context in which the disclosed communication method is described. FIG. 1 also introduces a number of terms used throughout the specification, such as in-bound and out-bound communication links, up-link, down-link, base station and control centre.

FIG. 1 shows a functional diagram of a system 500 in which the disclosed communications technique can be practiced. A ship at sea 501 communicates on an up-link 502 with a satellite 503. The satellite 503 forwards the aforementioned communication as depicted by an arrow 504 to a base station 505. The end-to-end communication between the ship 501 and the base station 505 is referred to as an "in-bound" communication as depicted by a dashed arrow 512. An "outbound" communication would be a communication in the opposite direction as the dashed arrow 512.

The base station 505 communicates, as depicted by an arrow 506 with a control centre 507. The control centre can be a Master Control Centre (MCC) if there are a number of control centres in the system. The control centre 507 processes the received information, and communicates the processed information, as depicted by an arrow 508 with the base station 505. The base station 505 forwards this processed information, as depicted by an arrow 509 to the satellite 503, which forwards the information, as depicted by an arrow 510, to a ship 511. The communication depicted by the arrow 510 is referred to as a "down-link" communication while the communication depicted by the arrow 502 is referred to as an "up-link" communication. The end-to-end communication comprising the uplink 509 and the downlink 510 is referred to as "out-bound" communication, this being in a shore-to-ship direction. The end-to-end communication comprising the uplink 502 and the downlink 504 is referred to as "in-bound" communication, this being in a ship-shore direction.

Figure 2:
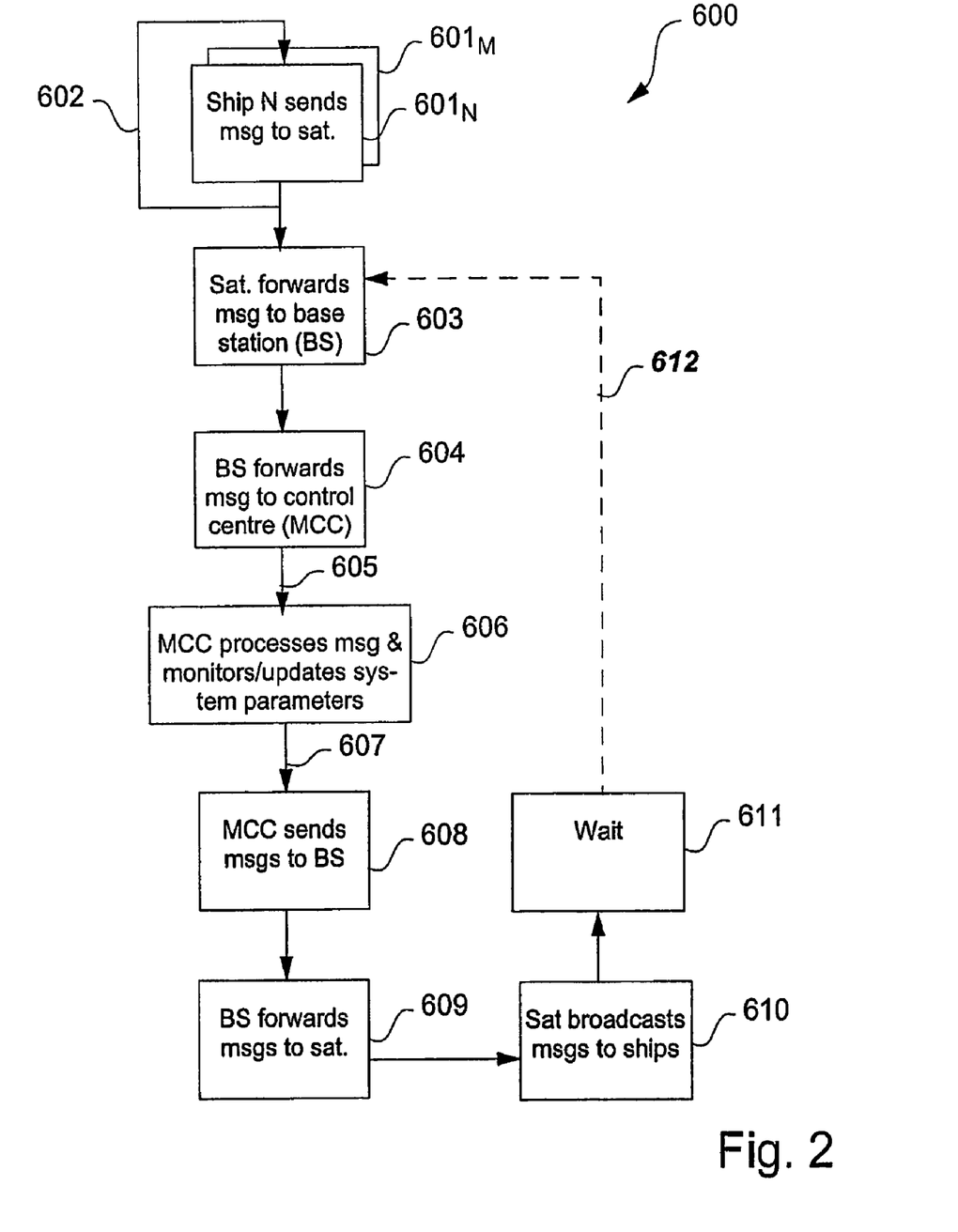
FIG. 2 is a flow diagram of a process depicting operation of the system described in relation to FIG. 1.

FIG. 2 is a flow diagram of a process 600 depicting operation of the system described in relation to FIG. 1. The process 600 commences with a step $601_N$ in which a mobile terminal on a ship N (eg., 501 in FIG. 1) sends a message to a satellite (eg., 503 in FIG. 1). A step $601_M$ is shown partly hidden behind the step $601_N$ to indicate that the process diagram 600 relates to a plurality of ships N, . . . , M, each ship sending messages to the satellite as determined by the respective mobile terminal on that ship. An arrow 602 flows from an output of the step $601_N$ back to the input in a looped configuration. This arrow 602 indicates that the ship N continues to send messages to the satellite as required by various functions such as positional reporting and so on.

In a subsequent step 603, the satellite (eg., 503 in FIG. 1) forwards the message to a base station (eg., 505 in FIG. 1). Thereafter in a step 604, the base station 505 forwards the message to a control centre (eg., 507 in FIG. 1), the process then being directed in accordance with an arrow 605 to a step 606.

In the step 606 the control centre 507, which in the present example is a Master Control Centre (MCC), processes the message, and both monitors and updates various system parameters as will be described in relation to FIG. 3. The process 600 is then directed in accordance with an arrow 607 to a step 608 in which the MCC 507 sends messages, generated as a result of processing the incoming message from ship N, to the base station 505.

Thereafter, in a step 609 the base station 505 forward these messages to the satellite 503, and subsequently in a step 610 the satellite 503 forwards (ie broadcasts) these messages to a number of ships, as depicted by arrows 510 and 513 in FIG. 1.

Accordingly, returning to FIG. 1, it is seen that the single message emitted from the ship 501 is received by the MCC 507, which then re-broadcasts a number of messages resulting from processing of this initial message, to a number of ships. In FIG. 1 the ships receiving the re-broadcast messages are 501 and 511, however clearly this is extendable to a broader class of vessels discussed in relation to FIGS. 5 and 6.

After the step 610, the process 600 is directed to a step 611, which is a wait state. The process 600 remains in the wait state depicted by the step 611 until one of the ships N, . . . , M sends another message to the satellite 503 by means of the respective process steps $601_N$, . . . , $601_M$, which causes the process 600 to be directed in accordance with a dashed arrow 612 back to the step 603.

Figure 3:
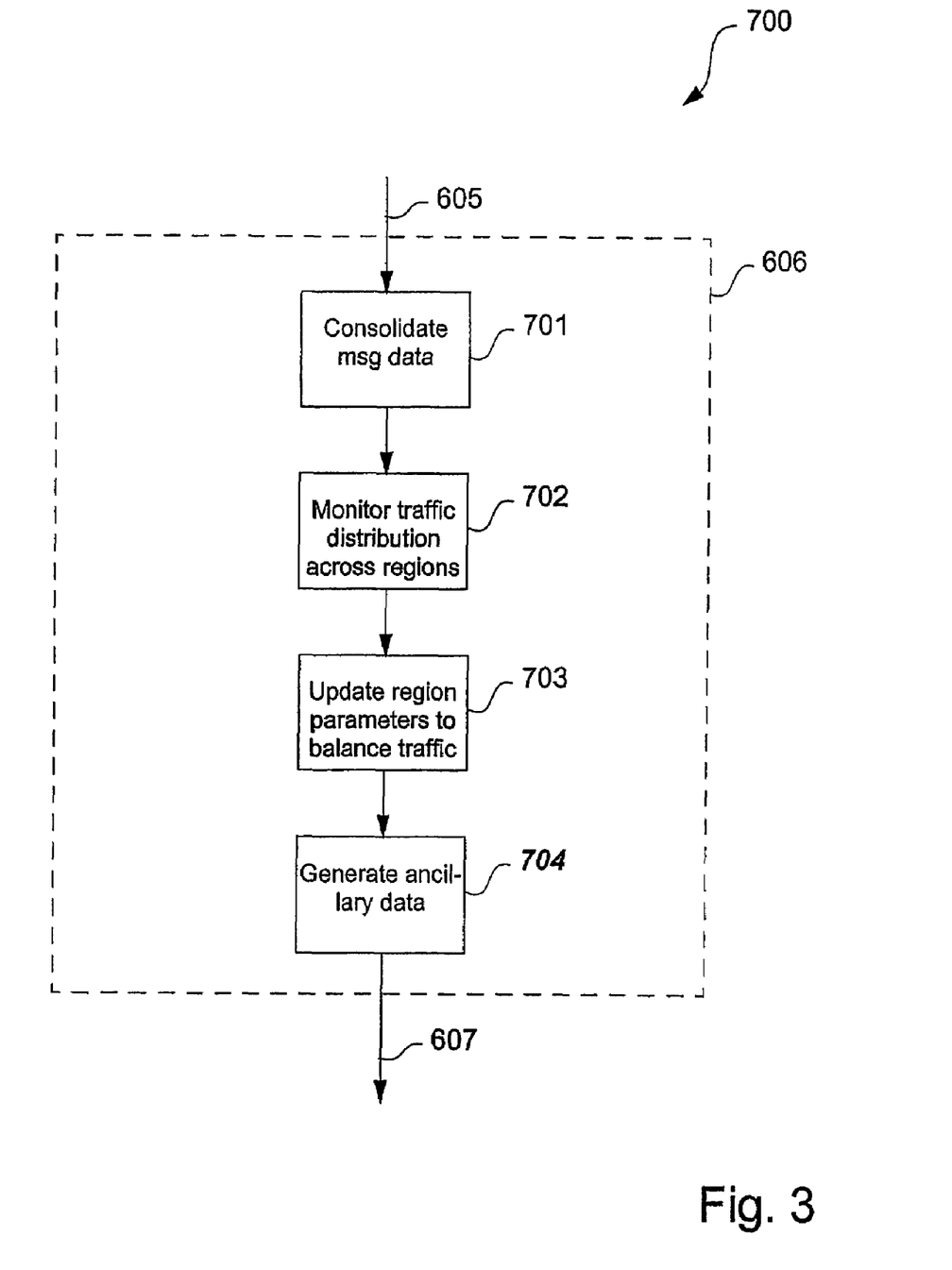
FIG. 3 depicts MCC processes referred to in FIG. 2.
Figure 6:
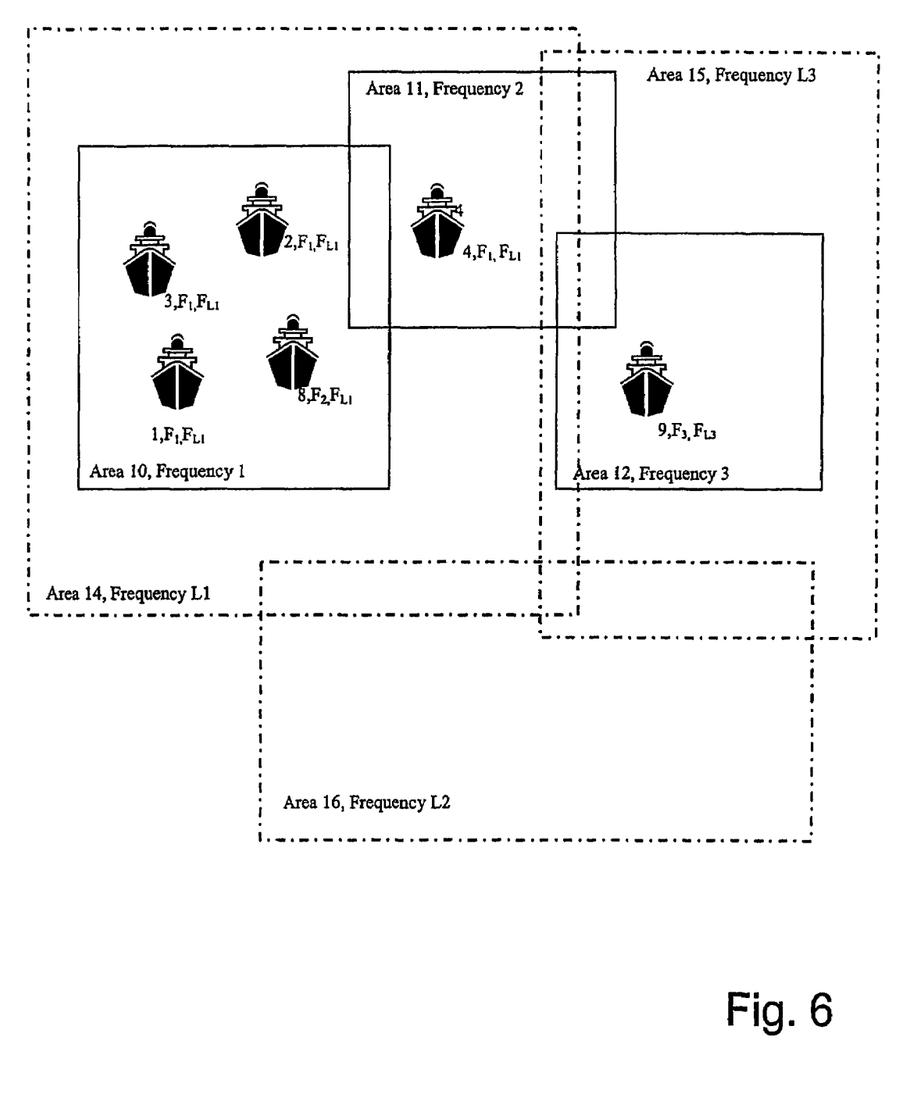
FIG. 6 depicts geographic regions and ships allocated to the regions, as determined by the control centre.

The MCC performs two functions:

(a) Prioritize and route data on the basis of defined geographical areas, to required remote monitoring destinations in "real time", including ships;

(b) Process positional data and provide Vessel Traffic Management Services (VTMS);

FIG. 3 relates to MCC functions, and depicts the step 606 in FIG. 2 in more detail. The step 606 thus commences with a step 701 in which the MCC consolidates incoming message data from the ships N . . . M. This message consolidation will be further described below. Thereafter, in a step 702 the MCC monitors traffic distribution from the ships within its area of control. This traffic monitoring function yields a picture to the MCC of how traffic is distributed geographically. Thereafter, in a step 703, the MCC updates region parameters in order to ensure that regions are defined in a manner that balances traffic across the various regions. The resultant regions are depicted in FIG. 6. In a subsequent step 704 the MCC generates ancillary data which is also communicated using the disclosed system.

The MCC is operable to perform the following functions:

Consolidation of Data:
  Data Compression by only sending differential position information, or data that has changed since previous reports, or data relating only to moving vessels, or using digital compression techniques to compress how latitude and longitude information is sent;
  Intelligent scheduling and transmission of information such that information for ships whose position relative to other ships or to the shore or other navigational dangers is repeated more often than isolated ships;
  Consideration of special ships which have been identified as carrying dangerous cargoes, or large ships, or ships that are in some way impeded in terms of movement—eg barges or vessels on tow, whose positions are sent more frequently,
  Consideration of ships who have been declared to be in an emergency situation where positions are sent more frequently;
  Scheduling and transmission of other data not comprising position information which may be broadcast to all ships in a region, or to a specific ship depending upon the nature of the data. This includes ship ID's, cargoes, routing information, or any other relevant ship data, in addition to general communication—such as E-mail traffic.
  Processing of the data to identify missing data, or erroneous data or invalid data with appropriate management to a specific vessel to identify the nature of the data event through polling a terminal for specific data to be repeated or the terminal to switch to a pre-defined test mode(s);

Region Based Operations:
  reassign frequencies to individual ships based on region and data throughput requirements
  broadcast within a frequency/s (i.e. the fleet) consolidated information pertinent to that area and adjacent areas Ancillary Data Issues:
  deliver pertinent data to harbour authorities
  deliver pertinent data to marine park authorities
  deliver data to safety net providers such as the Australian Maritime Safety Authority
  deliver pertinent data to participating maritime nations
  deliver individual vessel data to ship owners and their assigns.

The MCC broadcasts information to all ships and any ship monitoring shore facilities within a large region using the appropriate satellite high bandwidth out-bound link via the Base Stations. This natural broadcast capability provides a major advantage for a satellite ABS network in terms of its operating capabilities and general information dissemination.

Figure 4:
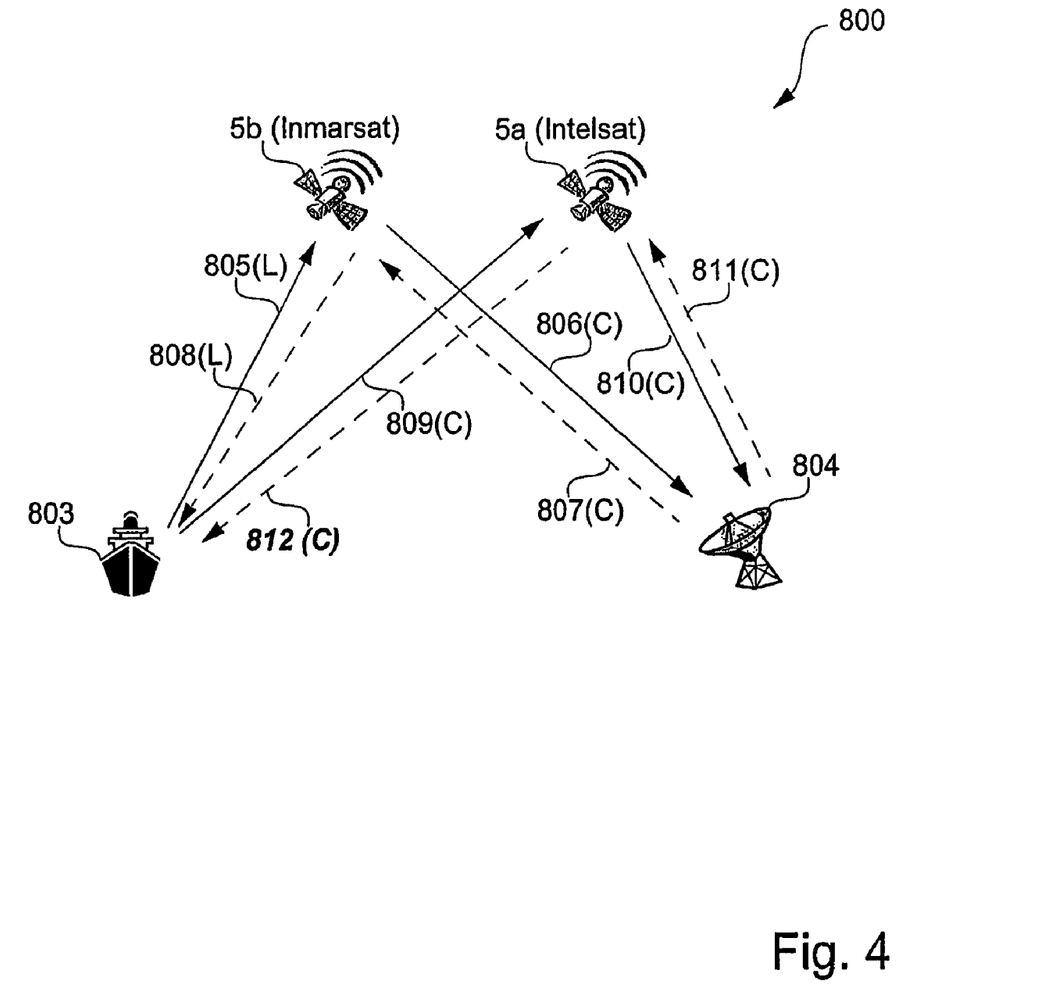
FIG. 4 shows a two satellite arrangement relating to communications between a ship and a base station.

FIG. 4 shows a two satellite arrangement, particularly relating to communications between a ship and a base station. In the arrangement 800 two satellites 5b and 5a are provided. The satellite 5b, which in practice can be implemented using an Inmarsat satellite, provides uplink and downlink communications to a ship 803, as depicted by respective arrows 805 and 808, in the L spectral band. The satellite 5b carries a frequency translator on board, and accordingly a downlink and an uplink between the satellite 5b and a base station 804 are performed using the C spectral band, as depicted by respective arrows 806 and 807. The reference numerals associated with the various up and down links have the particular spectral band appended thereto, for clarity of explanation.

The satellite 5a, which in practice can be implemented using an Intelsat satellite, communicates with the ship 803 using up and down links in the C spectral band, as depicted by respective arrows 809 and 812. Communication between the satellite 5a and the base station 804 is also performed using the C band spectrum, as depicted by respective arrows 810 and 811.

Figure 5:
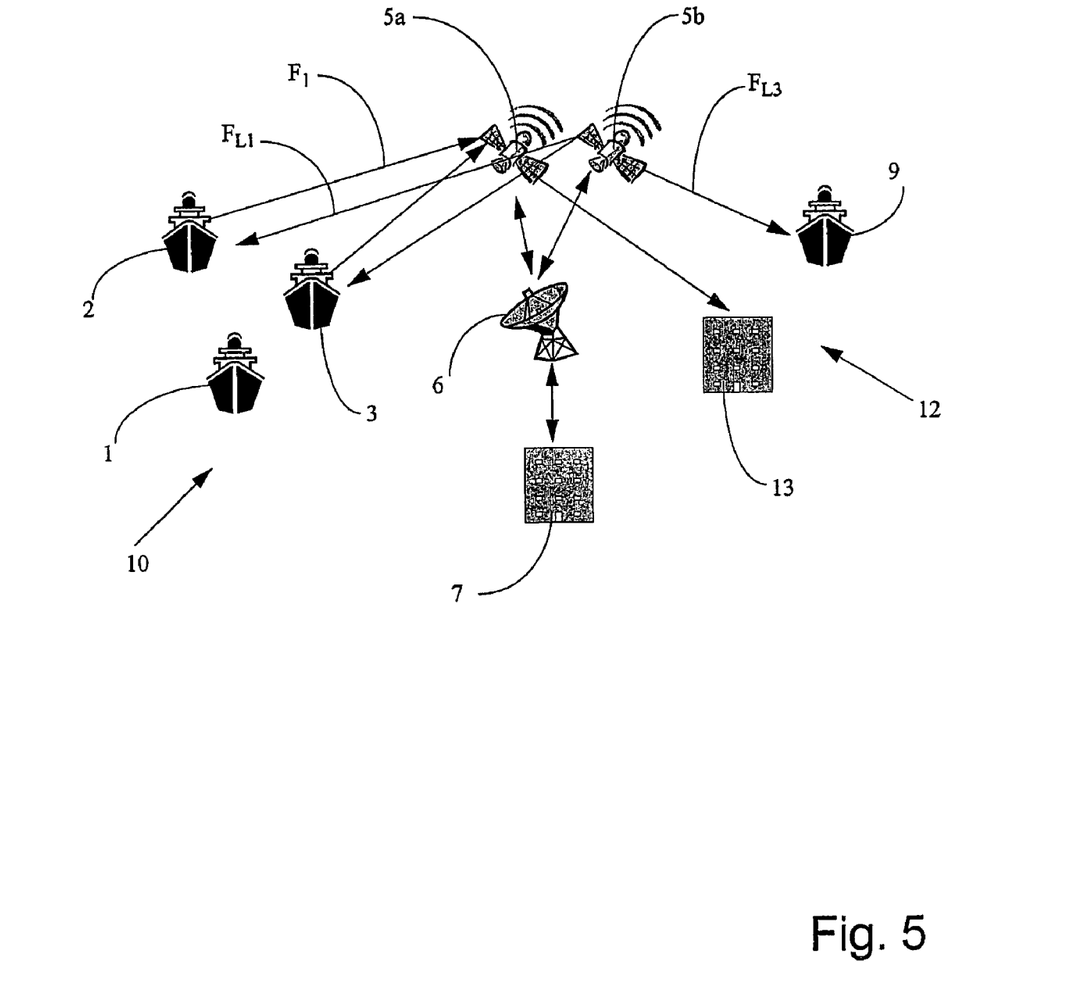
FIG. 5 shows a schematic diagram of a first arrangement of the disclosed communications system.

FIG. 5 shows a schematic of components in a first arrangement of the system, whereby ships 1, 2, and 3 share a common broadcast outbound frequency ($F_{L1}$ using the Inmarsat satellite 5B) and/or ($F_{c1}$ using the Intelsat satellite 5a) and another ship 9 is on different broadcast outbound frequencies ($F_{L3}$ using the Inmarsat satellite 5b) and/or ($F_{c3}$ using the Intelsat satellite 5a). The ships 1, 2 and 3 will report their positions and activities on an in-bound frequency ($F_1$). Ship 9 would report on an in-bound frequency $F_3$. The frequencies are allocated on the basis of regions and data transmission requirements, with different regions having different in-bound and outbound broadcast frequencies. There are regions which control inbound frequency allocation and satellite (because more than one satellite 5a can operate for inbound use) and there are different regions controlling the outbound frequency allocation and satellite (because more than one satellite 5b can operate for outbound use). For inbound transmission, for which regions are depicted as rectangles having solid borders in FIG. 6, Ships 1, 2 and 3 can be considered to be in a first region—Area 10, with ship 9 in a third region—Area 12.

Up to two Satellites 5a, 5b are used. The satellite 5a provides the C band spectrum links for the ship to shore communications i.e. the in-bound communications (see 809 and 810 in FIG. 4). The satellite 5b provides L band spectrum broadcast channels for the shore to ship links (see 807 and 808 in FIG. 4). The satellite 5a can also provide band spectrum as broadcast channels for the shore to ship links (see 811 and 812 in FIG. 4). In addition, the L and/or C band satellite (ie., 5b and 5a respectively in FIGS. 4 and 1) supports broadcast links for fixed site ship monitoring facilities 13.

The master control centre 7 will allocate an assigned operating frequency and a TDMA time slice for each ship, on which it can report its position. Each ship will report its position and activity in its allocated time slice and on its allocated frequency via its allocated satellite.

Ship 1 will report its position, within the allocated TDMA time slice, and on its allocated frequency ($F_1$), via the C-band satellite 5a.

The ships report their position and activity, and ships are grouped by region and frequency to a specific satellite. The master control centre 7 ensures that all ships know the whereabouts and activity of other ships in their vicinity, through an outbound broadcast discussed later.

The C-band satellite 5a sends the information regarding the ships position to the master control centre 7 via a base station 6. The master control center 7 processes the position and maintains a database of all vessel positions. The processed data is then distributed, via satellite and/or terrestrial links, to other ships and remote monitoring sites 13 that require the information.

The ships can report at data rates required by the International Maritime Organisation (IMO) AIS reporting requirements (including 2 second and 3 minute reporting frequencies). The C band link (809 and 810 in FIG. 4) has sufficient capacity to support a large number of ships reporting at these high rates. In addition to position reports, additional data related to destination, way-points and other ancillary information, and as required by IMO AIS reporting requirements, is transmitted from the ship. This data can be sent in time slots allocated by the MCC 7 upon a request to the MCC 7 by the ship. It is the MCC's 7 responsibility to allocate regions 10, 11, 12 (see FIG. 6) and the ensuing frequency distribution so the data load is balanced across the network to provide capacity for extra data communications.

The master control centre 7 will then filter this large amount of information coming in from the ships and determine the appropriate data to be broadcast on the L band (ie., 807 and 808 in FIG. 4) or C band (ie., 811 and 812 in FIG. 4) satellite links to the ships and fixed monitoring sites. The fixed monitoring sites are not limited to outbound data on L band (data received by the monitoring site) but the master control center can also utilize outbound C band to the fixed monitoring sites to accommodate additional information that is not necessarily sent to other ships in the region.

This provides the most robust and cost effective transmission schemes for transferring data directly to end-users.

The data sent to the MCC 7 from the ships is then routed back via the broadcast channel to all ships in the region, as well as ships in adjacent regions—as will be discussed in more detail below. The system design allows for high priority, fast report, transmissions to be routed from one ship to another ship with a latency less than 5 seconds.

The System design assumes that the current International Maritime Organisation (IMO) autonomous ship reporting requirements are maintained and that the system complexity and hence technical risk is minimized through well-established technique of assigning unique satellite operating frequencies to a region.

The C band satellite link (ie., 809 and 810 in FIG. 4) provides ample capacity for supporting position reporting and ship to shore communications, and the L band satellite links (ie., 807 and 808 in FIG. 4) provide cost effective shore to ship communications. The C band reporting scheme is managed by L band or C band broadcast transmissions and in an emergency would allow a ship to be tracked even when it was unable to receive broadcast shore to ship communications.

The disclosed arrangement uses Broadcast Out-bound Time Division Multiplex (TDM) communication carriers operating to all ships within a defined region from the base station 6. The broadcast carriers initially use the L band satellite links in one of two configurations:

a) For larger IMO vessels current Inmarsat B high gain tracking antenna's are shared with vessels using the disclosed communication method to support data-rates of up to 144 kbps for fast updates (low latency) vessel positions;

b) For smaller vessels Omni-directional low gain receive antennas are used to receive lower bit rate broadcast channels up to 4.8 kbps for slower updates of vessel positions.

In the case of C band broadcast channels the TDM channel generally operates at data rates between 11 and 64 kbps to ships antennas with a nominal medium gain 18 dBi antenna (range 16 to 26 dBi). Even higher data rates are also feasible with more satellite power offering data rates up to few hundred kbps.

The region sizes vary depending upon the traffic loadings within the defined regions and can be as small as Singapore Straits Area or as large as the Southern Pacific Ocean. The regions can be easily adapted as the operational requirements dictate. Different carriers provide coverage in different areas, and in some cases Global Beams can entirely overlap with hemispherical Beam high traffic regional areas.

First System Arrangement

According to a first system arrangement, the in-bound channels operate at C band (ie., 809 and 810 in FIG. 4) in burst node TDM access, at a lower rate of 4.8 kbps and potentially 16 kbps on global beams in frequency division multiplex. The baseline design uses Binary Phase Shift keying (BPSK) modulation to meet inter-satellite interference requirements and approximately 2880 inbound channels can be supported on a single 36 MHz Global Beam C band satellite transponder with 10% guard band between each carrier occupying a 10 kHz bandwidth. However the system can also use discrete C Band frequencies rented on an as needed basis.

The in-bound channel supports approximately 40 byte (320 bit) transmissions that result in 60 ms data bursts at 4.8 kbps. As the vessel position is well defined satellite differential path delay timing corrections will be calculated by the MCC 7.

Periodically the Control Centre 7 will determine the spatial distribution of all vessels, to group them spatially by frequency, and thus reassign frequencies of the in-bound transmissions, to ships as is illustrated in FIG. 6. The frequency allocated to the ship will depend upon the location of the ship—as has already been described above. So, in FIG. 6, ships in area 10 are allocated frequency $F_1$, in area 11, $F_2$, and those in area 12, $F_3$. In FIG. 6, ship 8 has moved into area 10 and ship 4 into area 11. Ship 8 has moved into Area 10 from Area 11, and ship 4 has moved into Area 11 from Area 10. As a consequence, ship 8—which had a frequency $F_2$ from operating in Area 11—is allocated frequency 1 ($F_1$) by the master control centre 7, and ship 4—which had a frequency $F_1$ from operating in Area 10—is allocated frequency 2 ($F_2$). Ship 9 in area 12, and ships 1, 2 and 3 in area 10 keep the same frequency, as they have not moved out of the region. This allocation is based on proximity and frequency resource allocation rules. These rules balance the reporting load across the frequencies and group the vessels spatially by also modifying the size and location of regions 10,11 and 12. Modifications to regions 10,11 and 12 are optimised to minimise the need to reallocate frequencies and are used to balance reporting loads across frequencies.

In the same way, the master control centre 7 groups ships by using areas 14 and 15 (depicted by rectangles having dot-dashed outlines) to allocate outbound frequencies and satellites. These regions are not necessarily the same as used for inbound communications management. So ships 1,2,3,4 and 8 are all inside region 14 and will share outbound frequency $F_{L1}$. Similarly ship 9 is in region 15 and utilises frequency $F_{L3}$.

The master control centre 7 reallocates the frequencies for each ship, and then broadcasts the ships' positions to other ships, not only to the region in which the ships are in, but to adjacent regions—as has been mentioned above. For example, for the arrangement of FIG. 6, Frequency $F_{L1}$ is used to broadcast all ship positions in Area 14, and those same positions are broadcast into Area 15 using Frequency FL3 and/or FC3. Likewise, the master control centre 7 broadcasts the positions of all ships in Area 16 across outbound frequencies ($F_{L1}$), ($F_{L2}$) and ($F_{L3}$), because there are two regions—Area 14 and Area 15—adjacent to Area 16.

The frequency that a ship reports on is controlled by the allocation of a time slice by the MCC 7. The nominal design for ease of system operation is that a 3-minute reporting rate is set for stationary vessels and 2 seconds for active moving vessels. The system is dimensioned to support these anticipated network loadings.

Second System Arrangement

An alternative preferred implementation of this system is to use an Omni-directional type of C band antenna for both the in-bound and Broadcast channels. Such an antenna provides nominally 18 dBi gain, and comprises a series of elements which are switched in azimuth, to provide fully mobile coverage.

This antenna arrangement has sufficient gain to support both operation of the system with the single C band satellite 5a so eliminating the requirement for the L band satellite 5b to broadcast information.

This antenna arrangement does not offer sufficient off axis antenna discrimination and hence a spread spectrum modulation scheme is required on the inbound channel as defined in Table 1 to ensure that the overall International Telecommunications Union (ITU) off axis Equivalent Isotropically Rated Power (EIRP) recommendations are not exceeded.

Nominal spread spectrum inbound channel bearers are as follows:

TABLE 1

C Band Inbound Channel Nominal Link Parameters

| Intelsat Beam | Global | Hemi | Zone |
| --- | --- | --- | --- |
| Bit Rate (bps) | 320 | 640 | 640 |
| Bandwidth (kHz) | 200 to 500 | 200 to 500 | 200 to 500 |
| Spreading Factor | 127 to 1042 | 63 to 521 | 63 to 521 |
| Number of users | 5 to 17 | 5 to 17 | 5 to 17 |
| Link Margin (dB) | 3.6 | 3.9 | 5.6 |

A range of spread spectrum channel rates can be used with complex trade off between the terminal transmit EIRP of nominally 15 dBW, the occupied signal bandwidth, the overall network throughput, and the antenna side-lobe characteristics which impact the overall radio interface design.

The spread spectrum codes are built using standard overlay or tiered code is techniques which use a Gold code sequence of either 23 or 31, with a Barker code sequence of length between 7 and 15. This significantly simplifies the overall synchronisation of the spread spectrum signal waveform at the receiver. Then either BPSK or QPSK modulated Nyquist Filtered signal waveforms are used with between Rate ½ and Rate ¼ Convolutional Turbo codes to provide the required signal bandwidth of between 200 and 500 KHz.

The Broadcast channel also operates at C band as shown in Table 2, and uses a similar spread spectrum signal waveform operating within a channel bandwidth of nominally between 1.25 and 3.0 MHz, although other bandwidths are feasible. The spread spectrum signal is used to provide adjacent satellite interference rejection of up to 10 equivalent strength satellite signals from neighbouring satellites.

TABLE 2

C Band Broadcast Channel Nominal Link Parameters

| Intelsat Beam | Global | Hemi | Zone |
| --- | --- | --- | --- |
| Bit Rate (kbps) | 9.6 to 32 | 9.6 to 64 | 9.6 to 64 |
| Bandwidth (MHz) | 1.25 to 3.0 | 1.25 to 3.0 | 1.25 to 3.0 |
| Spreading Factor | 63 to 180 | 31 to 180 | 31 to 180 |
| Maximum Number of Signals from Adjacent satellites | 10 | 10 | 10 |
| Link Margin (dB) | 2.0 | 2.0 | 2.0 |

The use of adaptive spread spectrum receivers allows potential of higher data rates by using interference suppression or interference cancellation techniques.

The Frequency Division Multiplex and TDMA system description and time slot allocation previously described still operate in an identical manner, except now the terminal has to be assigned or derive from its Identity suitable spreading sequences to operate on the network. These techniques are well known to those who work in the industry.

The ships carry a mobile terminal that is used to communicate with the satellites.

Figure 7:
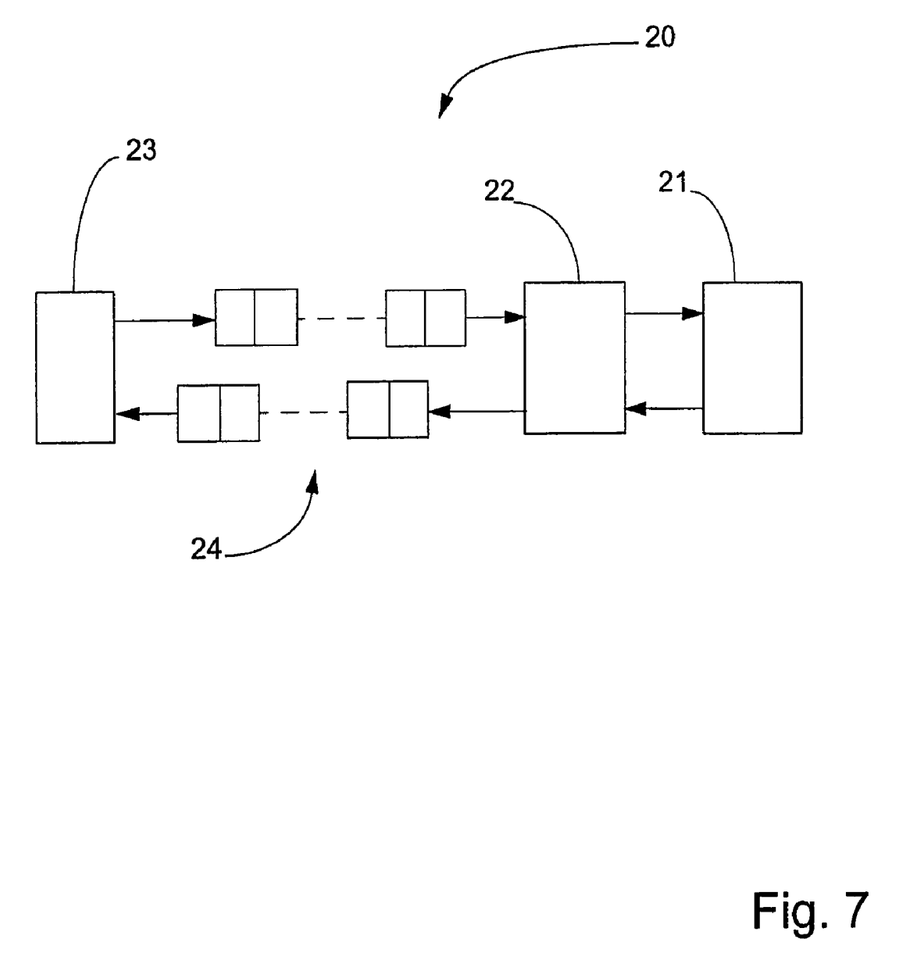
FIG. 7 schematically illustrates the mobile terminal architecture.

FIG. 7 schematically illustrates the mobile terminal architecture.

The mobile terminal 20 comprises an antenna, a satellite transceiver and modem 21, a microcomputer 22, a Global Positioning System (GPS) receiver, a power supply and an external interface 23. The external interface 23 is a physical interface to the shipboard computer system and the communications application. Input and output message queues 24 are communicated between the interface 23 and the microcomputer 22.

Terminal Antenna for L/C Band System Arrangement

For this arrangement, the transmit antennas are not mechanically steered and therefore require no moving parts. This enhances the reliability and robustness of the transmit telemetry information. For L band, 2 flat square patches, 5 by 5 cm sized, antennas can be used. For C band, an array of 5 patches, about 1½ cm in diameter, can be used. Integrating the antenna, transceiver, modem, GPS receiver and microcomputer into a single unit enables the size of the mobile terminal 20 to be about the size of a VHS Video tape. Also, a second external antenna can be used if the super-structure of the ship blocks the transmission and reception of signal to the satellite. This ensures substantially 100% coverage.

Terminal Antenna for C Band System Arrangement

For the single C band satellite solution for both the inbound and Broadcast channels the antenna performance is an important factor in supporting the link. The C band antenna uses a series of switched elements with a gain of around 18 dBi after switching losses. The implementation uses separate transmit and receive antennas to simplify the design. The antenna can also be integrated into a single housing.

The antenna design can be modified to support either regional or global coverage with a single ring of helices providing an elevation coverage across 45 degrees. Hence two sets of rings provide global coverage.

The terminal uses standard C band Transceiver and Low Noise Block Down converter to provide an L band IF or low IF interface to the satellite modem. The system design allows the terminal to be implemented without a diplexer, such that the network messaging protocols allow for the terminal to operate in a half duplex manner.

For a power supply, the mobile terminal 20 is connected to the ship's power bus with a rechargeable backup battery that sustains at least transmission for a few days. Thus, the mobile terminal 20 has low power consumption and is at least able to transmit position information when power supply from the ship's main bus is cut off. Current L-band technology allows 100-150 Global Positioning System (GPS) position reports to be sent on the power of a small 9-volt (square) battery, and it is believed that the disclosed system can send a similar number using C band.

The terminal configuration and reporting strategies are remotely managed over the satellite links so that the mobile terminal 20 health and capabilities can be managed by the master control centre 7. The mobile terminal 20 can also be disabled, in terms of both transmitting and receiving functions, if it is not configured correctly by the master control centre. Data security is also important in terms of the overall system operation.

For positioning accuracy, a 12-channel GPS receiver is sufficient for 10 m accuracy on the high seas. However, reverse differential GPS can be used when a ship is close to a fixed GPS receiver, enabling 1 m accuracy. This method of determining GPS corrections by use of a fixed GPS receiver to perform corrections on the positions received at the receiver is known to persons skilled in the art. This correction information can then be broadcast back to the terminal, allowing a differential GPS position to be determined.

A high-speed external interface can be provided to interface to the shipboard computer system. Physically, the connection should be a shielded wireline connection, such as a IEEE 802.3 10Base2 or 10Base5 or 10Base-FL (Fibre optic) connection, which can easily provide a 10 Mbps connection greater than 100 m in length.

The TDMA return channel technique requires the inbound channels to reserve slots based on the reporting frequency of the terminal. In addition to reserved TDMA slots, additional inbound capacity is set aside for slotted aloha communications to handle items such as:

terminal power on;

terminal changing beams;

terminal changing status, i.e., increase or decrease reporting rates;

The TDM outbound channel manages the TDMA link time plans. The main features being broadcast on the TDM, other than vessel reports, are:

Responses to terminal requests for capacity changes;

Broadcasting the frequencies of the Slotted Aloha channel;

Other messages as required.

This specification thus discloses, according to one arrangement, a system for monitoring ships, the system comprising at least one satellite located in a geostationary orbit (GSO), a base station coupled to a control centre, and a mobile terminal located on a ship, whereby data is transmitted between the control centre and a mobile terminal via the satellite and the base station, the data including information regarding the ship upon which the mobile terminal is located, and whereby the control centre is operable to forward data received from the mobile terminal to all other mobile terminals located within the vicinity of the mobile terminal.

The system can include a first satellite operable to receive signals from the mobile terminals, and a second satellite operable to broadcast signals to the mobile terminals. The first satellite can receive signals within a predetermined frequency range, preferably, being the C band spectrum. These frequencies typically depend upon the location of the mobile terminal sending the signal to the first satellite.

The second satellite is operable to broadcast signals within a predetermined frequency range, preferably, being the L band spectrum. An alternative arrangement is that the second satellite is not required, and that a second C band frequency is used on the first satellite to broadcast information. The broadcast frequency depends upon the location of the mobile terminal to which the signal is being broadcast.

The control centre is operable to determine the location of the mobile terminal and to allocate the operating frequency of the mobile terminal in dependence upon the determined location. The system can further include fixed monitoring stations, the first satellite being operable to transmit data to fixed monitoring stations.

The disclosed arrangement has the advantage that C Band signals, as with L band, are subject to almost no rain fade link degradations and has the benefit of pre-existing GSO satellite providing global, (backed-up) coverage and satellites owned/operated by well established companies such as Intelsat and PanAmSat. In addition, the C band satellite network of the disclosed communications arrangement comprises 3 satellites each using a single Global Beam can provide an International Maritime Organisation Automatic Identification System (AIS) capacity in excess of 80,000 vessels, with required AIS system reporting rates including 2 second reporting intervals for active moving vessels.

INDUSTRIAL APPLICABILITY

It is apparent from the above that the arrangements described are applicable to the transport and communication industries.

The foregoing describes only some embodiments of the present invention, and modifications and/or changes can be made thereto without departing from the scope and spirit of the invention, the embodiments being illustrative and not restrictive. Thus, for example, although the described embodiments are directed to ship-based systems, the invention can also be applied to other mobile-platform systems such as fleets of trucks or trains.

The invention claimed is:

1. A method of communicating data among a plurality of mobile platforms via at least one geostationary satellite, said method comprising the steps of:

establishing a plurality of geographic regions dependent upon at least one of beam coverage areas of the at least one geostationary satellite and traffic loads associated with each region;

sending an inbound message, from one of said plurality of mobile platforms, via said at least one geostationary satellite and a base station to a control center, the inbound message including spatial information for said one mobile platform;

consolidating, by the control center, of the inbound message, to thereby reduce a traffic volume of outbound messages associated with said inbound message; and sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform;

wherein after the sending of the inbound message, and prior to the sending of the outbound messages, the method comprises the further steps of:

determining a total traffic load for the plurality of mobile platforms as a function of spatial locations of the mobile platforms; and establishing a plurality of geographic regions, each of which contains an associated sub-set of the plurality of mobile platforms, to thereby balance, between the plurality of geographic regions, the traffic load for each of the associated sub-sets of the plurality of the mobile platforms, wherein:

the inbound message is sent over a first geostationary satellite using the L band frequency for the mobile platforms-to-satellite up-link and the C band frequency for the satellite-to-base station down-link, and the outbound message is sent over a second geostationary satellite using the C band frequency for the base station-to-satellite up-link and the C band frequency for the satellite-to-mobile platforms down-link.

2. A method according to claim 1, wherein the inbound message and the outbound messages are transmitted using FDM-TDMA modulation.

3. A mobile terminal adapted for use in a system for communicating data among a plurality of mobile platforms, said system including at least one geostationary satellite, a base station, said mobile terminal and a control center, the mobile terminal comprising:

means for determining, for one of said plurality of mobile platforms on which the mobile terminal is located, spatial information for the mobile platform;

means for receiving information, from the control center via the at least one geostationary satellite, regarding a plurality of geographic regions across which the mobile platforms are distributed, the geographic regions being dependent upon at least one of beam coverage areas of the at least one geostationary satellite and traffic loads associated with each region;

means for determining, depending on said geographic region information, transmit parameters for sending an inbound message;

means for sending an the inbound message, using the transmit parameters, via said at least one geostationary satellite and the base station to the control center, the inbound message including the spatial information; and a C-band terminal including an antenna having a nominal gain of 18 dBi, and adapted (a) to transmit a signal having a bit-rate between 300 and 2400 bps, and (b) to receive a signal having a bit-rate between 11 to 64 kps, wherein the transmitting and the receiving is performed in a half-duplex manner at RF.

4. A mobile terminal according to claim 3, the mobile terminal further comprising:

means for determining, for said one of said plurality of mobile platforms on which the mobile terminal is located, at least one of;

(a) a speed of the mobile platform; and (b) a geographic region to which the mobile platform has been allocated by the control center, and wherein:

said means for sending the inbound message is further adapted to send the inbound message dependent upon said at least one of the speed of the mobile platform and the geographic region.

5. A method of communicating data among a plurality of mobile platforms via at least one geostationary satellite, said method comprising the steps of:

establishing a plurality of geographic regions dependent upon at least one beam coverage area of the at least one geostationary satellite and traffic loads associated with each region;

receiving an inbound message, from one of said plurality of mobile platforms, via said at least one geostationary satellite and a base station by a control center, the inbound message including spatial information for said one mobile platform;

consolidating, by the control center, of the inbound message, to thereby reduce a traffic volume of outbound messages associated with the inbound message; and sending outbound messages dependent upon the consolidated inbound message, via the base station and the at least one geostationary satellite, to a sub-set of said plurality of mobile platforms, said sub-set of mobile platforms being in at least one of (a) the same geographic region, and (b) adjacent geographic region(s), as said one mobile platform;

wherein after the receiving of the inbound message, and prior to the sending of the outbound messages, the method comprises the further steps of:

determining a total traffic load for the plurality of mobile platforms as a function of spatial locations of the mobile platforms; and establishing a plurality of geographic regions, each of which contains an associated sub-set of the plurality of mobile platforms, to thereby balance, between the plurality of geographic regions, the traffic load for each of the associated sub-sets of the plurality of the mobile platforms, wherein:

the inbound message is received over a first geostationary satellite using the L band frequency for the mobile platforms-to-satellite up-link and the C band frequency for the satellite-to-base station down-link, and the outbound message is sent over a second geostationary satellite using the C band frequency for the base station-to-satellite up-link and the C band frequency for the satellite-to-mobile platforms down-link.

* * * * *